United States Patent [19]

Lianza

[11] E Patent Number: Re. 32,137

[45] Reissued Date of Patent: May 6, 1986

[54] GRAPHICAL REPRESENTATION TRANSDUCING

[75] Inventor: Thomas A. Lianza, Beverly, Mass.

[73] Assignee: Eikonix Corporation, Bedford, Mass.

[21] Appl. No.: 320,337

[22] Filed: Nov. 12, 1981

Related U.S. Patent Documents

Reissue of:

[64] Patent No.: 4,256,969
Issued: Mar. 17, 1981
Appl. No.: 92,493
Filed: Nov. 8, 1979

U.S. Applications:

[63] Continuation-in-part of Ser. No. 960,051, Nov. 13, 1978, abandoned.

[51] Int. Cl.[4] ..... H01J 40/14

[52] U.S. Cl. ..... 250/578; 358/213

[58] Field of Search ..... 250/556, 566, 578; 356/404, 444; 358/213, 285, 293; 235/470

[56] References Cited

U.S. PATENT DOCUMENTS

| | | | |
|---|---|---|---|
| 2,262,584 | 11/1941 | Herriott | 178/7.6 |
| 3,104,369 | 9/1963 | Rabinow et al. | 340/146.3 |
| 3,600,593 | 8/1971 | Berler | 250/235 |
| 3,614,241 | 10/1971 | Sanford et al. | 356/444 X |
| 3,812,459 | 5/1974 | MacNeill et al. | 340/146.3 F |
| 3,814,494 | 6/1974 | Shiragai et al. | 350/6 |
| 3,830,972 | 8/1983 | Siverling et al. | 178/7.1 |
| 3,867,569 | 2/1975 | Watson | 358/293 |
| 3,868,167 | 2/1975 | Schreiber | 350/7 |
| 3,914,546 | 10/1975 | Hamaker et al. | 178/7.6 |
| 4,146,786 | 3/1979 | Agulnek | 250/578 |

OTHER PUBLICATIONS

"Two-Dimensional Image Sensor Using One-Dimensional Sensor Array," Williams IBM Tech. Discl. Bull., vol. 21, No. 2, Jul. 1978, pp. 436–437.

*Primary Examiner*—David C. Nelms
*Attorney, Agent, or Firm*—Charles Hieken

[57] ABSTRACT

A light source illuminates a film stage through a magnifying lens that is selectively transmitted to a photodiode array over a first path including a mirror and pellicle and a second path including the first mirror and the pellicle, a selectively movable second mirror, third and fourth mirrors, a first lens element between the second and third mirror and a second lens element between the third mirror and the pellicle providing a reduction of three. Relay optics between the pellicle and a fourth mirror provides an image of the film stage on a screen. The column of 1024 diode detectors are electrically scanned to provide one dimension of a rectangular scan of the image and mechanically displaced to provide the other scan dimension. The output of the photodiode array is coupled to a recording system that may be analog or digital to record an electrical representation of the image on the film stage.

12 Claims, 1 Drawing Figure

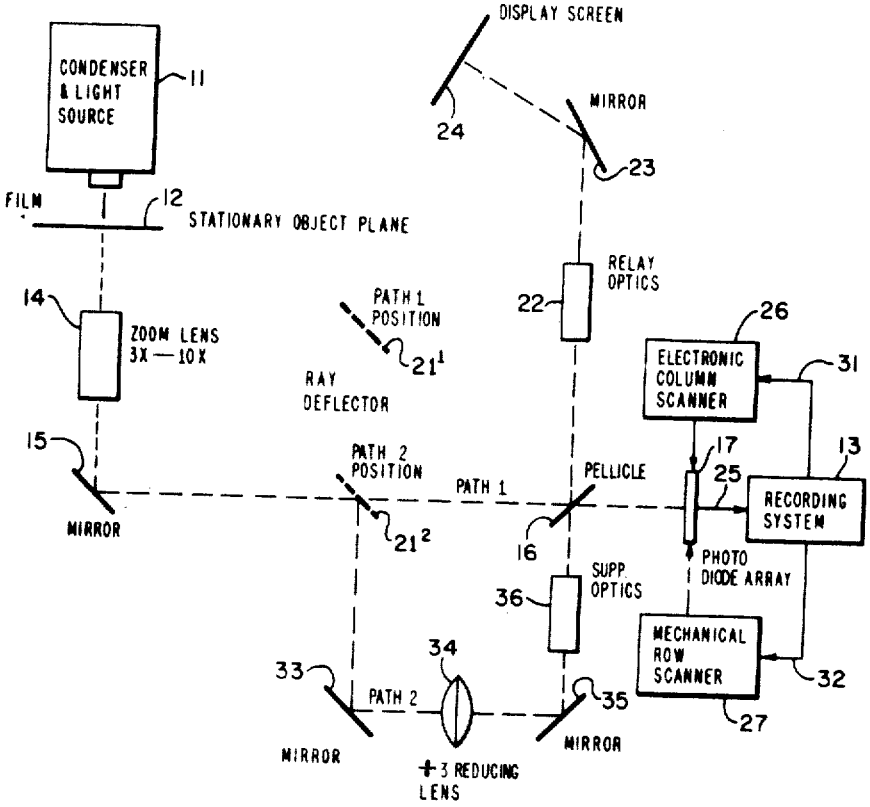
DISPLAY SCREEN
CONDENSER & LIGHT SOURCE
11
24
MIRROR
23
FILM
12
STATIONARY OBJECT PLANE
RELAY OPTICS
22
14
PATH 1 POSITION
21¹
ZOOM LENS 3X — 10X
26
ELECTRONIC COLUMN SCANNER
31
RAY DEFLECTOR
15
PATH 2 POSITION
PATH 1
PELLICLE
17
25
13
RECORDING SYSTEM
MIRROR
21²
16
PHOTO DIODE ARRAY
SUPP. OPTICS
36
MECHANICAL ROW SCANNER
34
33
PATH 2
35
32
27
MIRROR
MIRROR
÷3 REDUCING LENS

GRAPHICAL REPRESENTATION TRANSDUCING

Matter enclosed in heavy brackets [ ] appears in the original patent but forms no part of this reissue specification; matter printed in italics indicates the additions made by reissue.

REFERENCE TO PRIOR COPENDING APPLICATION

This is a continuation-in-part of application Ser. No. 960,051 filed Nov. 13, 1978, abandoned.

BACKGROUND OF THE INVENTION

The present invention relates in general to graphical representation transducing and more particularly concerns novel apparatus and techniques for providing an electrical representation of a graphic work with high resolution at relatively low cost with great reliability suitable for recording in digital or analog form.

A typical prior art recording system comprises a light source that illuminates a photoelectric detector through a zoom lens and film stage. Moving the film stage scans the image therein. At higher zoom lens magnification stage motion error increases. The typical prior art approach to solving this problem involves using precision stage movement mechanisms to keep stage motion error low.

Accordingly, it is an important object of this invention to provide an improved graphical representation transducing system.

It is still a further object of the invention to achieve the preceding object while improving performance and reducing system cost.

It is still a further object of the invention to achieve one or more of the preceding objects while reducing error of the scanning stage motion as zoom lens magnification is increased.

It is still another object of the invention to achieve one or more of the preceding objects while increasing the range of magnification.

It is still another object of the invention to achieve one or more of the preceding objects while relatively compact structure.

It is still a further object of the invention to achieve one or more of the preceding objects while allowing the graphic work being transduced to be viewed.

It is still another object of the invention to achieve one or more of the preceding objects with structure that is relatively easy to operate by relatively unskilled personnel.

SUMMARY OF THE INVENTION

According to the invention, there is zoom lens means for selectively magnifying an object stationary in an object plane, photoelectric transducing means for providing an electrical signal representative of incident light energy, means for illuminating the photoelectric transducing means through the zoom lens with light from the stationary object to provide an image of the stationary object in the image plane including the photoelectric transducing means, and means for mechanically displacing the photoelectric transducing means to scan the image of the object. Preferably the photoelectric transducing means comprises a linear array of photodiodes that are mechanically displaced orthogonal to the array length, and there is means for electronically scanning the photodiodes in the array to provide the scan along one direction of a rectilinear scan of the image, the other of which is provided by the mechanical displacement of the array. According to another feature of the invention, there is means for selectively altering the path between the object and image planes for introducing a change in magnification while maintaining the image plane at the long conjugate side of the lens system so that the image of object remains in focus in the image plane. Preferably this means for altering includes reducing lens means for reducing the magnification, pellicle means for both transmitting and deflecting incident light rays arranged for transmitting the direct rays to the photoelectric transducing means along a first of the paths and the deflected rays thereto along a second of the paths, and selective ray deflecting means for selectively deflecting rays to said second path in a second position while allowing rays to pass through said pellicle means to said photoelectric transducing means in a first position.

According to another feature of the invention, there is screen means for displaying an image of the object in the object plane, and means for directing light rays from said pellicle means upon said screen means.

Numerous other features, objects and advantages of the invention will become apparent from the following specification when read in connection with the accompanying drawing.

BRIEF DESCRIPTION OF THE DRAWING

The single FIGURE of which is a combined pictorial-block diagram illustrating the logical arrangement of a system according to the invention.

DETAILED DESCRIPTION OF PREFERRED EMBODIMENTS

With reference now to the drawing there is shown a combined block-pictorial representation of a system according to the invention. A condenser and light source 11 illuminates a film 12 in a stationary object plane having a graphical representation to be transduced and recorded in the form of an electrical signal in recording system 13 that may comprise magnetic tape or other suitable recording medium that records electrical signals representative of the optical transmissivity or density at points on the film in analog or digital form and may, for example, comprise a digital memory that stores the density at film locations in respective addresses representative of corresponding positions on the film in a manner well-known in the art. The image of film 12 that is normally stationary in the stationary object plane of a lens system comprising zoom lens 14 that may typically provide a variable magnification from 3× to 10× is magnified by the latter and reflected by mirror 15 along path 1 directly toward pellicle 16 which transmits a predetermined fraction of the energy directly to the detecting image plane including photodiode array 17. In effect a line of the image of film 12 is focussed upon photodiode array 17. Ray deflector 21 is then in the path 1 position designated by the broken lines 21[1] and allows the energy reflected by mirror 15 to proceed along path 1 directly to pellicle 16.

A fraction of the energy incident upon pellicle 16 is reflected through relay optics 22 to mirror 23 and then upon a display screen 24, typically ground glass, to display a visual image embracing the portion of film 12 then being scanned by the apparatus to provide a representative electrical signal transduced by photodiode array 17 and delivered over line 25 to recording system 13. The individual elements in photodiode array 17 are sequentially scanned in conventional manner by electronic column scanner 26 to effect scanning along a column and mechanically displaced by a mechanical row scanner 27 in a conventional manner to effect scanning along a row direction, signals from recording system 13 being transmitted over lines 31 and 32 to scanners 26 and 27, respectively, to control the particular point in the image then in the photoelectric transducing means image plane that is transduced into an electrical signal provided on line 25.

When ray deflector 21 is in the path 2 position represented by the broken lines $21^2$, it deflects the light rays incident from mirror 15 toward mirror 33 and along path 2 through reducing lens 34 to mirror 35 through supplementary optics 36 to pellicle 16 where a fraction of the energy travelling along path 2 is reflected by pellicle 16 to photodiode array 17 so that the energy incident upon photodiode array 17 is independent of whether it reaches the array over path 1. or path 2. Pellicle 16 transmits a fraction of this energy through relay optics 22 to mirror 23 to display screen 24.

Having described the physical arrangement of a system according to the invention, the mode of operation will be described. Condenser and light source 11 illuminates film 12 in the stationary object plane so that with ray deflector 21 in the path 1 position $21^1$ zoom lens 14 focusses the image of film 12 upon the image plane including the photodiode array 17. Photodiode array 17 typically comprises 1024 photodiodes in a column along a line of the image then focussed upon the photoelectric transducing means imaging plane. Photodiode array 17 may typically comprise the commercially available Reticon type CCPD 1024 photodiode array available from Reticon Corp. Mechanical row scanner 27 may typically position photodiode array 17 at the left-hand edge of the image to be scanned, the diodes in array 17 sequentially scanned by electronic column scanner 26 in a conventional manner, typically from top to bottom, and photodiode array 17 stepped by an increment corresponding to the desired resolution, typically 16 μm prior to scanning the next column with electronic column scanner 26, and the process repeated until photodiode array 17 has been stepped across to a right edge of the image desired to be scanned. The specific systems for electronically scanning and mechanically scanning are known in the art, not a part of the invention and not described in detail herein to avoid obscuring the principles of the invention. For example, the electronic column scanner may comprise respective gates coupled to the output of each photodiode that are sequentially enabled with the gate outputs connected to line 25, and the mechanical row scanner may be substantially the same mechanism used in typical prior art systems in which the film 12 is mechanically stepped to effect scanning. A disadvantage of this prior art approach of mechanically displacing the film is that any error in mechanically positioning is magnified by zoom lens 14 so that the tolerance for the mechanical scanner must be maintained sufficiently tight to maintain a desired resolution for maximum magnification of zoom lens 14. An important advantage of the present invention is that increasing magnification provides increased precision. That is to say, the present invention decouples positional accuracy from the optics so that the system is more precise at higher magnification and at less cost.

Recording system 13 may comprise a microprocessor with associated memories that may provide appropriate signals on lines 31 and 32 to control scanning in accordance with well-known techniques and using the information concerning the particular optical cell of the image being transduced to provide the representative signal on line 25, store that representation in a known memory cell so that the memory may contain a complete representation of the image of the film in stationary object plane 12 with exceptionally high resolution. At the same time relay optics 22 comprises an element in a focussing system comprising zoom lens 14 that focusses the image of film 12 then being scanned upon display screen 24 so that an operator may view the image being recorded.

An important advantage of the invention is the wide effective zoom range with relatively compact structure by providing path 2 in which the magnification is reduced by a fixed factor, typically three, by reducing lens 34. In this arrangement ray deflector 21, typically also a mirror, mechanically moves to the path 2 position $21^2$ to deflect the light rays incident from mirror 15 upon mirror 33 which then deflects them along path 2 through reducing lens 34 to mirror 35 which then deflects the rays through supplementary optics 36 upon pellicle 16. Pellicle 16 then reflects a fraction of this energy upon photodiode array 17. Supplementary optics 36 functions to coact with zoom lens 14 and with reducing lens 34 so that the image of film 12 in the stationary [optics] *object* plane is still focussed on the photoelectric transducing means image plane including photodiode array 17. Since the distance between pellicle 16 and photodiode array 17 is the same for both path 1 and path 2 the degree of defocussing at pellicle 16 for both paths is substantially the same so that relay optics 22 may also function to focus the image of film 12 upon display screen 24 over path 2 without change. This advantageous arrangement effectively converts a zoom lens having a range of 3.33:1 to providing a zoom range of 10:1.

Pellicle 16 provides a useful function in allowing the simplification of electronics because its use according to the invention results in the energy incident upon photodiode array 17 being essentially independent of whether it arrives over path 1 or path 2. This result may be achieved by having the ratio of pellicle transmittance to reflectance arranged so that the light density on the array is normalized independently of the path chosen. Since the resultant energy density at the array transmitted over path 2 is greater than that over path 1 because of the lower magnification, pellicle 16 is preferably designed so that the energy transmitted over path 1 is more than that reflected over path 2. This desired ratio of transmittance to reflectance may be readily determined experimentally by initially substituting a mirror for pellicle 16 and measuring the ratio of light energy on photodiode array 17 with this mirror in and ray deflector 21 in the path 2 position $21^2$ relative to that measured with pellicle 16 removed and ray deflector 21 in path position $21^1$. Having measured this ratio (R), the desired ratio of transmittance to reflectance may be determined by calculating 1/R.

A typical prior art approach might well require a relatively complex normalization system that the present invention avoids.

In a specific embodiment of the invention zoom lens 14 is a Schneider Betavaron type zoom lens, the optical path lengths of path 1 and path 2 are 46.7 and 75.0 cm, respectively, photodiode array 17 is a commercially available type CCPD 1024 array from Reticon with the associated electronics for scanning. Mechanical row scanner 27 typically comprises a mechanical stage from Ardel Kinematic Inc.

While one preferred form of the invention includes a zoom lens, lens 14 could be a conventional lens that provides magnification, reduction or absence of magnification and reduction. Furthermore, pellicle 16 and the means for displaying the image being scanned may be omitted. A commercial embodiment of the invention having lens 14 comprise a reduction lens instead of a zoom lens has been shipped.

There has been described novel apparatus and techniques for converting the image of an object into electrically storable form with high resolution using compact apparatus exhibiting superior performance at reduced cost while materially increasing zoom range and allowing an operator to observe the portion being scanned. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited soley by the spirit and scope of the appended claims:

What is claimed is:

1. Graphical representation transducing apparatus comprising, means defining an object plane for supporting a fixed object to be imaged in a photoelectric transducing means image plane, lens means *in fixed relationship to both said object plane and said image plane* comprising means for focussing the image of said object upon said photoelectric transducing means image plane, photoelectric array transducing means in said photoelectric transducing means image plane for providing an electrical signal representative of the light intensity thereon, and means for mechanically displacing in *a plane including* said image plane said photoelectric transducing means *relative to said lens means* to scan the image of said object.

2. Graphical representation transducing apparatus [in accordance with claim 1 and further] comprising,

*means defining an object plane for supporting a fixed object to be imaged in a photoelectric transducing means image plane,*

*lens means comprising means for focussing the image of said object upon said photoelectric transducing means image plane,*

*photoelectric array transducing means in said photoelectric transducing means image plane for providing an electrical signal representative of the light intensity thereon,*

*means for mechanically displacing in said image plane said photoelectric transducing means to scan the image of said object,* display screen means for displaying an image of the object whose image is then being scanned by said apparatus, and pellicle means in the path between said lens means and said photoelectric array transducing means for directing a portion of the light energy incident thereon upon said photoelectric array transducing means and a portion thereof toward said display screen means.

3. Graphical representation transducing apparatus in accordance with claim 2 wherein said lens means comprises zoom lens means for providing variable magnification and further comprising, means including said pellicle means for defining a second light path between said zoom lens means and said photoelectric array transducing means, said second light path including alternate lens means for providing a predetermined fixed magnification for altering the effective zoom range of said scanning system, and means for selectively directing light energy from said object plane along a first path excluding and a second path including said alternate lens means.

4. Graphical representation transducing apparatus in accordance with claim 3 wherein said pellicle means has a ratio of transmittance to reflectance so that the light energy density incident upon said photoelectric transducing means is independent of whether said light energy arrived over said first path or said second path.

5. Graphical representation transducing apparatus in accordance with claim 1 wherein said photoelectric transducing means comprises a line array of photoelectric transducing elements, and further comprising means for sequentially scanning said photoelectric transducing elements to scan a line of said image in a direction generally perpendicular to the direction of displacement of said photoelectric transducing means effected by said means for mechanically displacing.

6. Graphical representation transducing apparatus in accordance with claim 1 wherein said lens means comprises zoom lens means for providing variable magnification.

7. Graphical representation transducing apparatus in accordance with claim 6 wherein said photoelectric transducing means comprises a line array of photoelectric transducing elements, and further comprising means for sequentially scanning said photoelectric transducing elements to scan a line of said image in a direction generally perpendicular to the direction of displacement of said photoelectric transducing means effected by said means for mechanically displacing.

*8. Graphical representation transducing apparatus in accordance with claim 1 wherein said lens means focuses the image of said object upon said image plane between first and second edges of the image to be scanned,*

*and said means for mechanically displacing mechanically displaces said photoelectric array transducing means across said image between said first edge and said second edge to scan said image along a first direction between said first and second edges,*

*and means for electronically scanning said photoelectric array transducing means to scan said image in a second direction,*

*thereby providing an electrical representation of the image of said object.*

*9. Graphical representation transducing apparatus in accordance with claim 8 wherein said image plane is at the long conjugate side of said lens means so that the image of said object remains in focus in said image plane.*

*10. Graphical representation transducing apparatus in accordance with claim 1 wherein said image plane is at the long conjugate side of said lens means so that the image of said object remains in focus in said image plane.*

*11. A method of providing an electrical representation of the image of a stationary object which method includes the steps of,*

*focusing the image of said object with a stationary lens means upon a photoelectric array transducing means in the image plane of said lens means to provide an electrical signal from said photoelectric array transducing means representative of the light intensity thereon between first and second edges of the image in the image plane,*

*mechanically displacing in a plane including said image plane said photoelectric array transducing means from said first edge to said second edge across said image,*

*an electronically scanning photoelectric elements in said photoelectric array transducing means as said photoelectric array transducing means moves across said image,*

*and receiving electrical signals from said photoelectric transducing means representative of the image of said object.*

*12. A method in accordance with claim 11 wherein said lens means has a long conjugate side and further including the step of establishing said image plane at the long conjugate side of said lens means so that the image of said object remains in focus in said image plane between said first and second edges.*

* * * * *

UNITED STATES PATENT AND TRADEMARK OFFICE

CERTIFICATE OF CORRECTION

PATENT NO. : Re.32,137

DATED : May 6, 1986

INVENTOR(S) : Thomas A. Lianza

It is certified that error appears in the above-identified patent and that said Letters Patent are hereby corrected as shown below:

On the cover page, at the end of the list of OTHER PUBLICATIONS add -- THERMAL IMAGING SYSTEMS, J.M. Lloyd, 1975, pp. 319, 322, 324 and 330 supplemented by pp. 10, 286 and 329. --.

Signed and Sealed this

Twenty-first Day of October, 1986

[SEAL]

*Attest:*

DONALD J. QUIGG

*Attesting Officer* *Commissioner of Patents and Trademarks*